United States Patent [19]
Fox et al.

[11] 3,930,892
[45] Jan. 6, 1976

[54] REPLACEMENT THERMOCOUPLE APPARATUS FOR A PILOT BURNER

[75] Inventors: Donnell H. Fox, Newport Beach; Donald K. Murrell, La Mirada, both of Calif.

[73] Assignee: Robertshaw Controls Company, Richmond, Va.

[22] Filed: Nov. 26, 1973

[21] Appl. No.: 419,225

[52] U.S. Cl. .................. 136/217; 136/242; 431/80
[51] Int. Cl.² ......................................... G01K 7/02
[58] Field of Search ............... 136/217, 242; 431/80

[56] References Cited
UNITED STATES PATENTS

| | | | |
|---|---|---|---|
| 3,290,178 | 12/1966 | Loveland | 136/242 |
| 3,650,843 | 3/1972 | Kenyon | 136/217 |

*Primary Examiner*—Verlin R. Pendegrass
*Attorney, Agent, or Firm*—Fulwider, Patton, Rieber, Lee & Utecht

[57] ABSTRACT

Replacement thermocouple apparatus for attachment to a pilot gas burner. The adaptor and thermocouple mounting portion are yieldably restrained against relative axially sliding movement to enable initial slip-on positioning of the thermocouple relative to the pilot burner flame. The thermocouple body is slightly rotated with an up and down movement within the adaptor to obtain final positioning of the thermocouple tip relative to the burner flame.

4 Claims, 4 Drawing Figures

REPLACEMENT THERMOCOUPLE APPARATUS FOR A PILOT BURNER

BACKGROUND OF THE INVENTION

1. Field of the Invention

This invention relates to gas-fired burners and a thermocouple control therefor.

2. Description of the Prior Art

The prior art, as exemplified by U.S. Pat. Nos. 3,522,107; 3,620,849 and 3,709,740, recognizes the desirability of properly orienting a thermocouple tip with respect to the flame issuing from a pilot burner by means of adaptor members. Those patents disclose satisfactory arrangements which permit ready installation of a thermocouple in a minimum amount of time and without requiring any special tools. The adaptors of the prior art, however, are comparatively expensive to manufacture, requiring expensive tooling and close tolerances.

SUMMARY OF THE INVENTION

It is a major object of the present invention to provide thermocouple apparatus that permits a thermocouple to be quickly and easily replaced and thereafter adjusted, and yet which may be manufactured at minimum cost.

It is a more particular object of the present invention to provide thermocouple apparatus of the aforedescribed nature having an adaptor which is threadable into a pilot burner mounting bracket and which axially slidably receives the externally threaded mounting portion of a thermocouple body. The adaptor houses a flexible spring clip engageable with the threaded mounting portion of the thermocouple body. The thermocouple is axially slidable relative to the spring to effect initial positioning of the thermocouple tip relative to the pilot burner. Final positioning of the thermocouple tip relative to the burner flame is effected by slight rotation and up and down movement of the thermocouple body within the adaptor.

The thermocouple apparatus of the present invention may be used with several types of pilot burners.

Other objects and advantages of the present invention will become apparent from the following detailed description when taken in conjunction with the accompanying drawings.

DESCRIPTION OF THE PREFERRED EMBODIMENT

Figure 1:
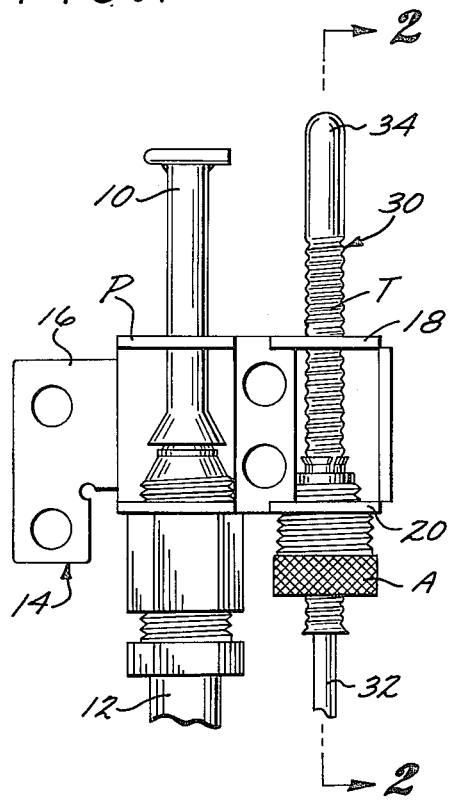
FIG. 1 is a side elevational view of thermocouplepilot burner assembly showing a thermocouple apparatus embodying the present invention.

Referring to the drawings, the thermocouple apparatus T of the present invention is shown in assembled relation with a conventional thermocouple-pilot assembly P. The thermocouple-pilot assembly P includes a pilot burner 10 supplied with a pilot flow of fuel by a conduit 12, as is well known in the art. The thermocouple-pilot assembly P also includes a mounting bracket generally designated 14 having a vertical leg 16 which is attached to a main burner (not shown). Integrally connected with vertical leg 16 are upper and lower horizontal arms 18 and 20, respectively. These arms 18 and 20 are formed with vertically aligned apertures 22 and 24 which receive a thermocouple body, generally designated 30. Lower aperture 24 is threaded. The lower end of thermocouple body 30 is connected to a thermocouple tubing 32 for attachment to a suitable thermoelectric appliance (not shown), all is well known in the art.

More particularly, the thermocouple body 30 is of elongated, generally cylindrical configuration having a smooth flame-engaging tip 34 below which is defined a mounting portion 36. Mounting portion 36 is formed with external screw threads 38.

The thermocouple body 30 is secured to the lower arm 20 of mounting bracket 14 by an adaptor A. Adaptor A includes a barrel-like body, generally designated 40, formed with a coaxial vertical opening 42 within which is disposed a sleeve-shaped spring clip, generally designated 48. The upper portion 49 of body 40 is formed with a first set of external threads 50. The intermediate portion 51 of body 40 is of larger diameter than upper portion 49 and formed with a second set of threads 52. The lower portion 54 of body A is formed with a knurled adjustment collar 56 that serves as a fingerhold.

Opening 42 includes an upper portion having its lower end defined by a radially inwardly-extending flange 57. The adaptor opening 42 within the intermediate body portion is larger in diameter than upper portion of the body 40 and includes a radially extending extension 58 through one side of the body. The fingerhold collar 56 includes at its upper portion, a radially inwardly extending neck 59.

Figure 2:
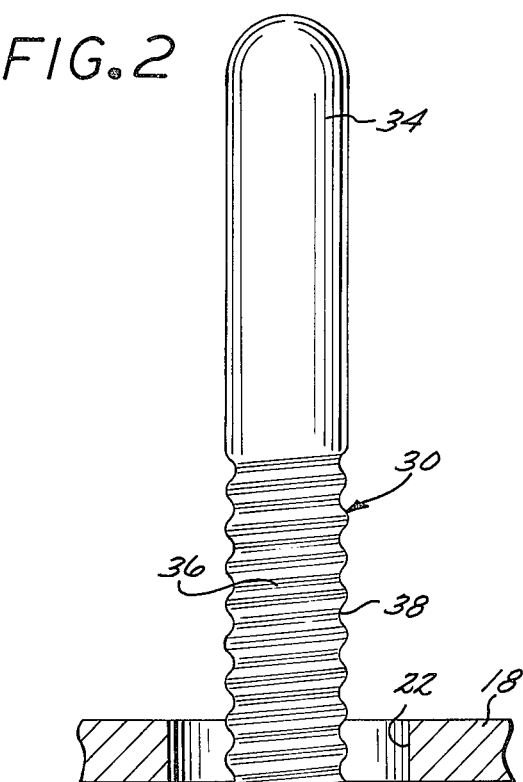
FIG. 2 is a vertical sectional view taken in enlarged scale along line 2—2 of FIG. 1.
Figure 4:
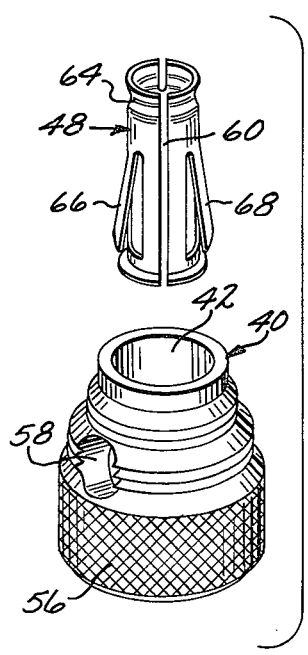
FIG. 4 is a vertically exploded perspective view of an adaptor member of said assembly.
Figure 4:
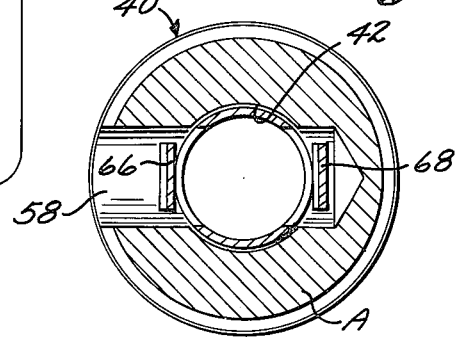
Figure 3:
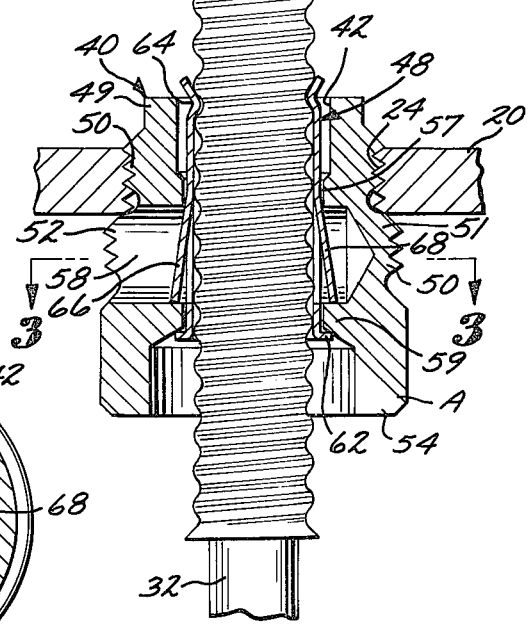
FIG. 3 is a horizontal sectional view taken on line 3—3 of FIG. 2.

The clip 48 may be of the type manufactured by Tinnerman Products, Inc. of Cleveland, Ohio and identified by the reference numeral 39 in U.S. Pat. No. 3,290,178 issued Dec. 6, 1966. Clip 48 consists of a piece of resilient sheet metal formed substantially into the shape of a tube or sleeve except for a slight space 60 between the opposite side edges of the sheet metal, with the lower end thereof flared outwardly to form an abutment flange 62. The upper surface of flange 62 normally abuts the lower end of neck 59, as shown in FIG. 2. An inwardly struck annular detent 64 is formed near the upper end thereof. Two diametrically opposed outwardly and downwardly extending and bent arms 66 and 68 are formed by cutting them on their two sides and across their bottoms from the sidewalls of the clip 48. The lower ends of arms 66 and 68 rest upon the upper surface of neck 59, as indicated in FIG. 2, with arms 66 and 68 extending into extension 58 so as to lock spring 48 against rotation relative to adaptor body 40. The engagement of the lower end of these arms with the upper surface of flange 62 and the underside of neck 59 restrains relative vertical movement between spring clip 48 and the adaptor body. Detent 64 of spring clip 48 frictionally engages threads 38 of the thermocouple body mounting portion 36 whereby relative rotation between adaptor body 40 and thermocouple body 30 will effect concurrent relative axial movement between such members. The engagement of detent 64 of spring clip 48 with the threads 38 also permits relative vertical sliding movement to occur between the spring clip and adaptor body 40 whereby the vertical position of thermocouple tip 34 relative to the flame issuing from pilot burner 10 may be adjusted.

In the use of the aforedescribed thermocouple apparatus, adaptor body 40 is first threaded into the opening 24 in lower arm 20. The diameter of such opening will vary in accordance with different types of mounting brackets so that with some mounting brackets, the upper threads 50 of adaptor body 40 will fit threaded opening 24, while in other types of mounting brackets, the threads 52 of the intermediate portion of adaptor body 40 will fit such opening. After the adaptor A is screwed into place in lower mounting bracket arm 20, the thermocouple body 30 will be urged upwardly through adaptor opening 42, the engagement of the spring clip detent 64 with the threads 38 permitting such vertical movement to take place. Initial positioning of the thermocouple tip 34 relative to the flame issuing from pilot burner 10 is obtained in this matter. Fine adjustment of the thermocouple tip relative to such flame may be effected by slightly rotating thermocouple body 30 relative to spring clip 48 and adaptor body 40.

It will be apparent that the mounting and vertical adjustment of the thermocouple body 30 can be achieved without requiring any special tools or technique on the part of the installer. It should also be noted that the adaptor A may be manufactured at a comparatively low cost. In this regard, spring clip 48 is a standard mass-produced part which is readily available on the market. The adaptor body 40 is adapted for comparatively inexpensive tooling. Moreover, the tolerances of such adaptor body are not highly critical whereby a low rejection rate is made possible. The length of adaptor body 40 and spring clip 48 insures proper alignment of the thermocouple body 30 relative to the mounting bracket 14. The provision of the fingerhold collar 56 makes it possible to easily position the adaptor body relative to the lower mounting arm bracket 20.

Various modifications and changes may be made with respect to the foregoing detailed description without departing from the spirit of the present invention.

What is claimed is:

1. Thermocouple apparatus for use with a burner having a mounting bracket formed with a threaded aperture, said thermocouple apparatus comprising:
    an elongated thermocouple body of generally cylindrical configuration having a flame-receiving tip and said body also having a mounting portion formed with external axially spaced grooves;
    a barrel like adaptor body formed with a coaxial opening that receives said thermocouple body, said body also being formed with external threads engageable with the threads of the mounting bracket aperture to secure said body therewithin; and
    a tapered frusto-conical spring clip that is openable circumferentially and includes means for locking said spring to said adaptor so as to be both axially and nonrotatably secured within the opening of said adaptor body, said spring clip being formed with a detent frictionally engaged with the grooves of the thermocouple body mounting portion whereby said body may be vertically adjusted relative to said adaptor body.

2. Thermocouple apparatus as set forth in claim 1 wherein:
    said adaptor body is formed with a second set of external threads axially spaced from the other threads and on a portion of said body of different diameter than the firstmentioned threads.

3. Thermocouple apparatus as set forth in claim 1 wherein:
    the grooves on said thermocouple body are threads whereby relative rotation between the adaptor body and the thermocouple body will effect concurrent axial movement therebetween.

4. Thermocouple apparatus as set forth in claim 2 wherein:
    the grooves on said thermocouple body are threads whereby relative rotation between the adaptor body and the thermocouple body will effect concurrent axial movement therebetween.

* * * * *